United States Patent
Miller et al.

(10) Patent No.: US 10,031,049 B1
(45) Date of Patent: Jul. 24, 2018

(54) HIGH TEMPERATURE HIGH PRESSURE NON-VITIATED HEATER

(71) Applicant: Florida Turbine Technologies, Inc., Jupiter, FL (US)

(72) Inventors: Timothy J Miller, Jupiter, FL (US); Scott A Baker, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 15/685,470

(22) Filed: Aug. 24, 2017

Related U.S. Application Data

(60) Provisional application No. 62/409,278, filed on Oct. 17, 2016.

(51) Int. Cl.
G01M 15/14 (2006.01)
G01M 15/02 (2006.01)

(52) U.S. Cl.
CPC ............ G01M 15/14 (2013.01); G01M 15/02 (2013.01)

(58) Field of Classification Search
CPC .......... F23J 13/025; F23L 17/02; F23L 17/04; F23C 2900/03009; F23C 3/002; F27B 9/068; F27B 9/10; F27D 2001/0073
See application file for complete search history.

(56) References Cited

U.S. PATENT DOCUMENTS

| | | |
|---|---|---|
| 2,415,064 A | 1/1947 | McCollum |
| 2,452,898 A | 11/1948 | Bourdette |
| 2,634,720 A | 4/1953 | Thulman |
| 2,711,683 A | 6/1955 | Ryder |
| 4,206,875 A | 6/1980 | Grasso |
| 4,410,037 A | 10/1983 | Biro |
| 4,488,681 A | 12/1984 | Lindsey |
| 4,929,173 A | 5/1990 | Jacobs et al. |
| 4,952,145 A * | 8/1990 | Kwiatkowski .......... B29C 35/06 126/92 AC |
| 5,224,857 A * | 7/1993 | Schultz ................. F27D 1/0023 126/92 R |
| 5,275,115 A | 1/1994 | Houston |
| 5,279,278 A * | 1/1994 | Logtens ................ F26B 23/022 126/116 R |
| 5,997,279 A | 12/1999 | Hosome et al. |
| 6,321,743 B1 | 11/2001 | Khinkis et al. |
| 6,450,162 B1 * | 9/2002 | Wang ....................... F23C 3/002 126/91 A |
| 7,762,807 B2 | 7/2010 | Linck et al. |
| 9,039,408 B2 * | 5/2015 | Kato ....................... F23C 3/002 126/251 |
| 2017/0067634 A1 * | 3/2017 | Wunning ................ F23L 15/04 |

* cited by examiner

Primary Examiner — Gregory A Wilson
(74) Attorney, Agent, or Firm — John Ryznic

(57) ABSTRACT

A non-vitiated compressed air heater facility that can heat a non-vitiated compressed air from around 1,100 degrees F. to over 1,600 degrees F. using three heat exchangers oriented in a vertical direction and connected in series, where each heat exchanger uses a number of heat pipes with burners to produce a hot gas at around 2,000 F that counter flows with non-vitiated compressed air flowing over the heat pipes to add heat to the non-vitiated compressed air flowing through the heat exchangers. The non-vitiated compressed air heated to at least 1,600 F can be used to test an aero vehicle in a wind tunnel under high Mach # conditions, or can be used to supply non-vitiated compressed air to test a large combustor of a gas turbine engine.

18 Claims, 5 Drawing Sheets

HIGH TEMPERATURE HIGH PRESSURE NON-VITIATED HEATER

CROSS-REFERENCE TO RELATED APPLICATIONS

This application claims the benefit to U.S. Provisional Application 62/409,278 filed on Oct. 17, 2016 and entitled HIGH TEMPERATURE HIGH PRESSURE NON-VITIATED HEATER.

GOVERNMENT LICENSE RIGHTS

None.

BACKGROUND OF THE INVENTION

Field of the Invention

The present invention relates generally to a high temperature and high pressure non-vitiated heater, and more specifically a test facility to supply a high temperature and high pressure non-vitiated air flow to a component being tested within the test facility.

Description of the Related Art Including Information Disclosed Under 37 CFR 1.97 and 1.98

In testing a component of a large frame heavy duty industrial gas turbine engine, a large volume of compressed air is required. In some cases, this volume of compressed air must also be heated to very high temperatures such as 1,500 degrees F. Compressed air can be heated by burning a fuel such as natural gas within the compressed air, but this method produces compressed air with low oxygen content. High pressure and high temperature compressed air with a normal oxygen content (referred to as non-vitiated air) is required in some cases.

A large volume of high pressure and high temperature non-vitiated air is also needed to test an aero vehicle such as a missile. A high Mach # simulation would require high temperature air due to the fact that a high Mach # missile traveling in normal atmospheric air would flow so fast that the outside air temperature would be very high such as over 1,100 degrees F.

BRIEF SUMMARY OF THE INVENTION

A high temperature and high pressure non-vitiated heater in which high pressure air from a supply is passed through a recuperator to preheat the non-vitiated air, which then flows around three heat exchanger cylinders to pick up additional heat. This non-vitiated air then flows through the three heat exchangers in series to reach a final temperature of non-vitiated air of around 1,500 degrees F. that is used in a test facility to test a component such as a high Mach # missile. Some of the non-vitiated air passing through the three heat exchangers reverses flow and passes within heated tubes where an acoustic attenuation ignitor is used to burn a fuel within the air to produce a hot gas stream that passed through the tubes that are used to further heat up the non-vitiated air passing through the heat exchangers.

The hot gas stream from the tubes is passed through a recuperator which is used to preheat the compressed air from the high pressure supply.

Each heat exchanger includes a number of heat exchanger tubes that are formed using a series of heat pipes with a hollow central passageway in which a heat exchanger fluid recirculates to transfer heat from the central passageway to the outer surface over which the non-vitiated air flows.

DETAILED DESCRIPTION OF THE INVENTION

The present invention is high temperature and high pressure non-vitiated heater used in a test facility in which gas turbine engine components or aero vehicle components can be tested under real conditions. In one case, a high Mach # missile is required to be tested under real operating conditions. At this high speed, the missile traveling through the air will be heated to around 1,500 degrees F. in a large combustor, preheated compressed air can be supplied that would simulate the conditions discharged from a compressor sized for that particular combustor that is to be tested.

Figure 1:
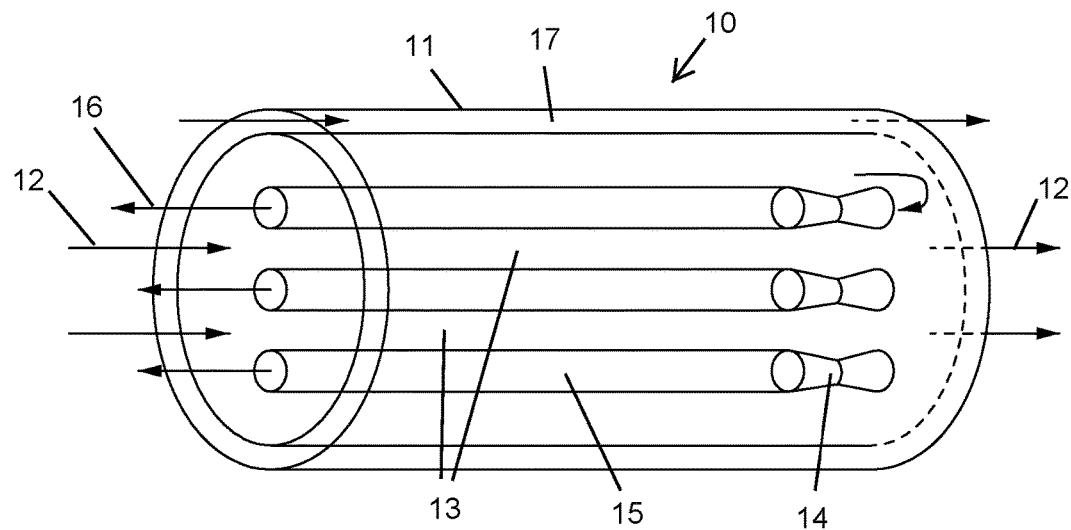
FIG. 1 shows a side view of a counter flow heat exchanger used in the high temperature high pressure non-vitiated heater of the present invention.

FIG. 1 shows a counter flow heat exchanger 10 used in the heater of the present invention. Preheated air 12 flows in from the left side as represented by the arrows. In this case, the air entering the heat exchanger is at 800 psi and 1,100 degrees F. at 50 lbs/sec. This non-vitiated air 12 air flows around heated tubes 15 and picks up addition heat. Some of this non-vitiated air flows out the right side of the heat exchanger 10 which in this case is non-vitiated air 12 at 750 psi and 1,500 degrees F. and 50 lbs/sec. The non-vitiated air 12 that does not flow out the right side turns and flow into an acoustic attenuation ignitor 14 where a fuel such as natural gas is injected and burned to produce a high temperature vitiated air stream within tubes 15 that exits the heat exchanger tubes 15 as high temperature vitiated (lower oxygen content) air 16, which in this case is at 1,100 degrees F. The heat exchanger 10 is enclosed within a cylinder 11 in which air can flow in a passage 17 formed between the outer wall of the heat exchanger 10 and the inner wall of the outer cylinder 11.

Figure 2:
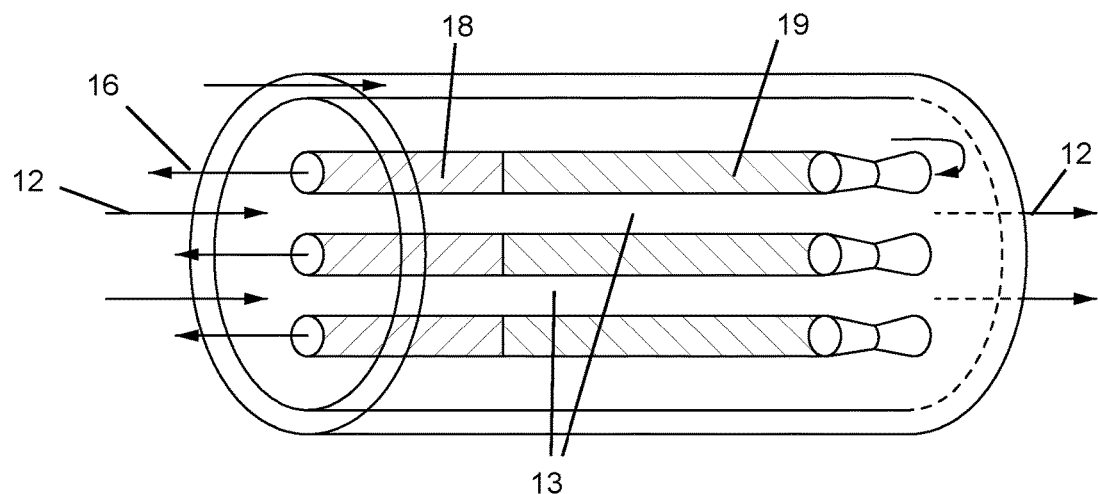
FIG. 2 shows another view of the heat exchanger of FIG. 1 with materials used.

FIG. 2 shows the heat exchanger 10 of FIG. 1 but with certain materials used in the tubes 15. An upstream side 19 would be made of isothermal furnace liner type heat pipe while the downstream side 18 would be Haynes 230 exhaust pipe. The upstream side 19 of the tubes 15 is formed from a series of heat pipes 19 that have an annular hollow wall in which a heat exchange fluid recirculates in the heat pipe to transfer heat from the inner wall to the outer wall of the heat pipe 19. The heat exchanger 10 and thus the heat pipes 19 are vertically arranged (see FIG. 6) in order that gravity will cause the heat exchange fluid to recirculate within the heat pipes.

Figure 3:
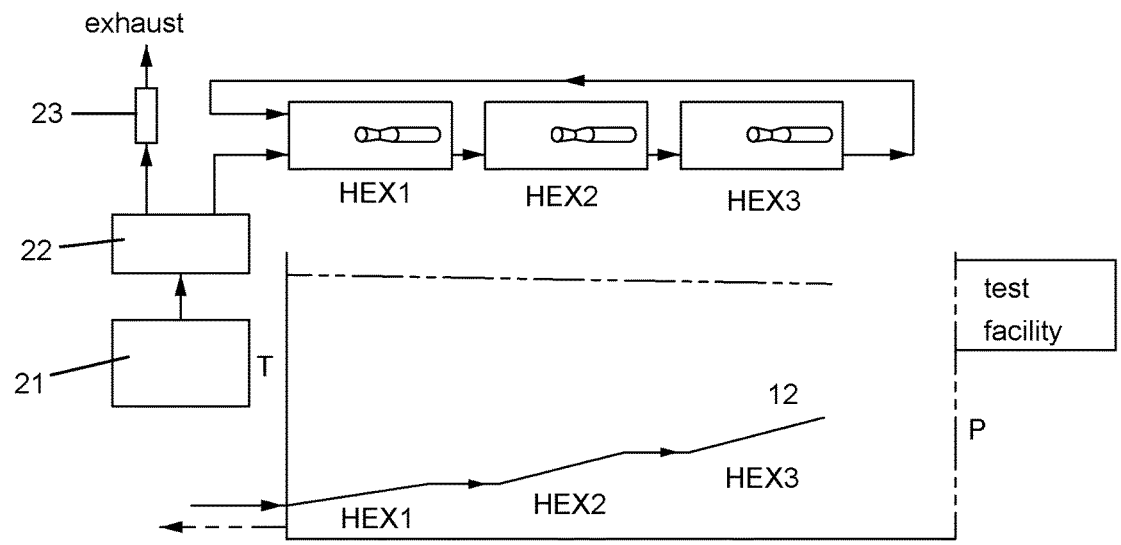
FIG. 3 shows a flow path with three heat exchangers of FIG. 1 in series with a graph of the temperature and pressure of the air flowing outside of the heat exchangers of FIG. 1.

In the actual high temperature and high pressure non-vitiated heater, a series of three of the heat exchangers 10 in FIG. 1 is used as seen in FIG. 3. A source of high pressure supply 21 such as an underground cavern 21 of a Compressed Air Energy Storage (CAES) system is used to supply high pressure air at around 50 degrees F. to a recuperator 22 that will preheat the non-vitiated air that will then be passed over the outside of the three heat exchangers 10. This non-vitiated air flows over the outside of the cylinders 11 of the heat exchangers 10 to pick up heat generated in the cylinder walls. The non-vitiated air then flows from the right side to the left side and enters into the heat exchanger 10 as non-vitiated air flow 12 that flows around the tubes 15 inside of the cylinders 11 as shown by 13 in FIGS. 1 and 2. This non-vitiated air is further heated by the hot gas flow passing through the tubes 15 in each of the three heat exchangers 10. FIG. 3 also shows a graph of the increase in temperature (T) of the non-vitiated air flow 12 passing through the three series of heat exchangers 10 (HEX1, HEX2, HEX3) outside of the cylinders 11. The pressure (P, dashed line) remains substantially the same through the three heat exchangers.

Figure 4:
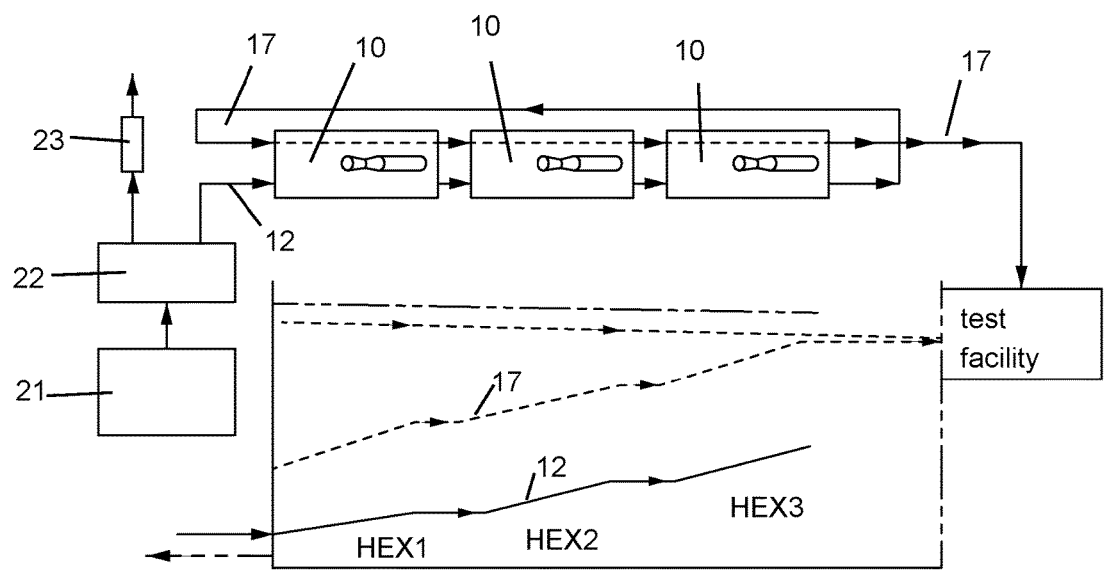
FIG. 4 shows a flow path with three heat exchangers of FIG. 1 in series with a graph of the temperature and pressure of the non-vitiated air flowing into the test facility.

FIG. 4 shows the non-vitiated air that passes through the three heat exchangers as completely heated non-vitiated air 17 that then flows into the test facility. In review, high pressure air from a supply 21 flows through a recuperator 22 to preheat the non-vitiated air, which then flows around the cylinders 11 of the series of three heat exchangers 10 to gain additional heat. This is the flow path 12 labeled in FIG. 4. This non-vitiated air is then passed through the series of three heat exchangers 10 within the cylinder 11 and around the tubes 15 as represented by the flow path 17. This is represented by the dashed line 17 from on the left side of the graph to the right side going into the Test Facility. The Pressure of the non-vitiated flow remains substantially the same through the three heat exchangers. This completely heated non-vitiated air then flows from passage 17 into the test facility.

Figure 5:
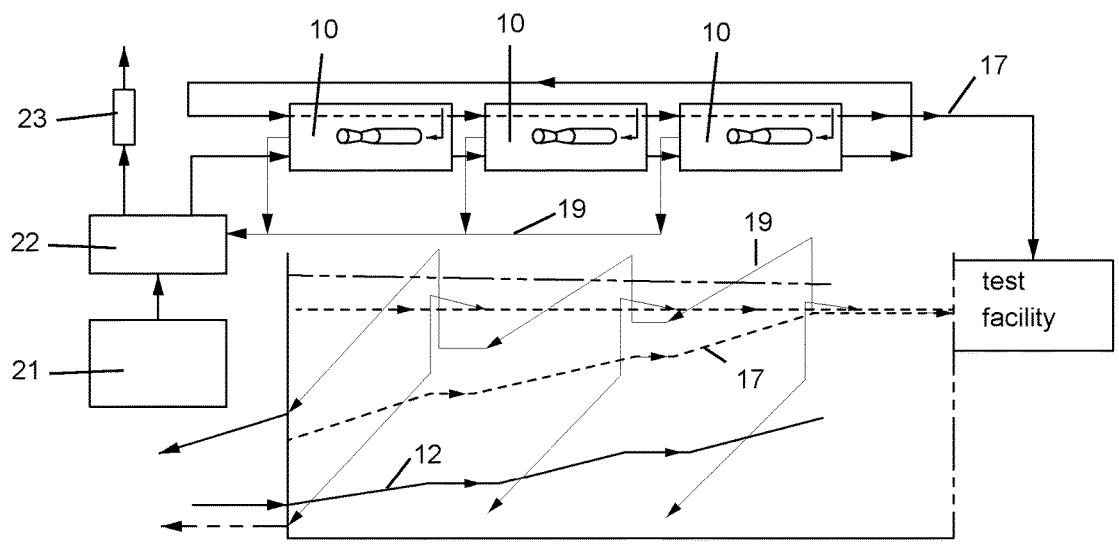
FIG. 5 shows a flow path with three heat exchangers of FIG. 1 in series with a graph of the temperature and pressure of the two non-vitiated air streams and the hot air burned with a fuel.

FIG. 5 shows additional features of the high temperature high pressure non-vitiated heater in which the hot gas stream from the tubes 15 which is vitiated air (low or no oxygen content) flows in passage 19 and through the recuperator 22 to preheat the cold compressed air from the high pressure supply 21. The vitiated air 19 is then discharged to atmosphere through a stack 23. This vitiated air is represented by the passage 19 that flows right to left in the graph. Some of the non-vitiated air 17 that flows into each of the heat exchangers 10 turns and flows through the acoustic attenuation ignitors 14 and burned with a fuel to form the high temperature gas stream within the tubes that is the flow 19 used to heat up the non-vitiated air passing over the tubes 15.

The graph is FIG. 5 shows the total flow from the storage reservoir 21 to the test facility. In summary, the cold compressed air from the storage reservoir flows through the recuperator 22 to gain heat, and then flows through passage 12 and into the series of heat exchangers 10 around the outside of the cylinder 11 to pick up additional heat. The heated non-vitiated compressed air flows from passage 12 and reverses and then flows through the series of heat exchangers from left to right in passage 17 which is inside of the cylinders and over the tubes 15. Some of this non-vitiated air turns and flows into the tubes 15 through the ignitors 14 to be burned with a fuel to provide heat in the tubes that is used to heat up the non-vitiated air flow 17 passing over the tubes 15. The remaining non-vitiated air that does not turn flows out in passage 17 and into the test facility. The vitiated air that was turned and burned with a fuel in the tubes 15 flows out and through the recuperator 22 to be used as the heat source that heats up the cold compressed air from the storage reservoir 21. The vitiated air from the recuperator is discharged to atmosphere through the stack 23.

The completed high temperature non-vitiated air 17 that flows into the test facility can be used to test an aero vehicle under high Mach # conditions. The air flow outside of the cylinder 11 in the heat exchanger 10 is at a higher pressure than the non-vitiated air flow within the cylinder 11, and thus a greater heat transfer rate occurs. Also, the pressure of the hot gas stream passing through the tubes is at a higher pressure than the non-vitiated air passing over the tubes, and thus a higher heat transfer rate also occurs here. A higher heat transfer rate occurs when the two flows across a wall is not around the same pressure.

Figure 6:
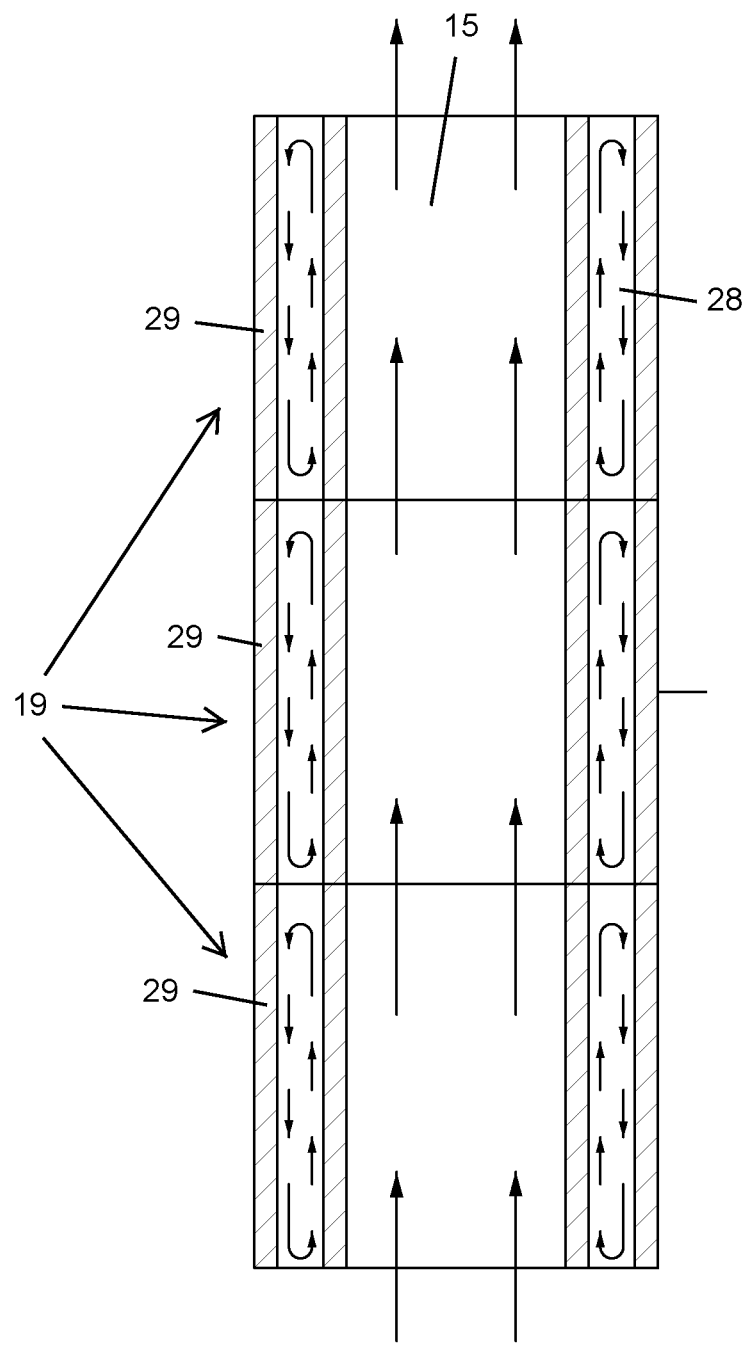
FIG. 6 shows a series of heat pipes used in the non-vitiated heater of the present invention.

FIG. 6 shows a representation of one of the heat pipes 19 used in the heat exchangers 10 to produce the high temperature non-vitiated used for testing of aero vehicles or components or gas turbine engine components such as combustors. As seen in FIG. 2 and discussed above, each heat exchanger tube 15 is formed with a series of heat pipes 29 in the upstream side followed by an exhaust pipe or tube 18. A series of heat pipes 29 are required since each heat pipe is limited to about 2 feet in length since any additional length does not produce any more heat exchange. Each heat pipe 29 includes the hollow central passage 15 in which the fuel and compressed air is combusted, and includes the annular heat pipe cavity 28 in which the heat exchange fluid recirculates as seen by the arrows. An acoustic attenuation ignitor 14 is located at the bottom entrance to the central passage 15 to inject fuel and the non-vitiated compressed air. The heat pipes 19 then connect to the inlet of the exhaust pipe 18. Only one exhaust pipe 18 is needed while a series of heat pipes 29 are required to produce the high temperature non-vitiated compressed air for testing. The walls of the heat pipe exposed to the hotter gas flow is made from Haynes 230 material and the heat pipe working fluid is lithium. For higher operating temperature, a refractory alloy material such as Tungsten or Niobium can be used and a protective coating applied to prevent oxidation of the refractory metal.

Figure 7:
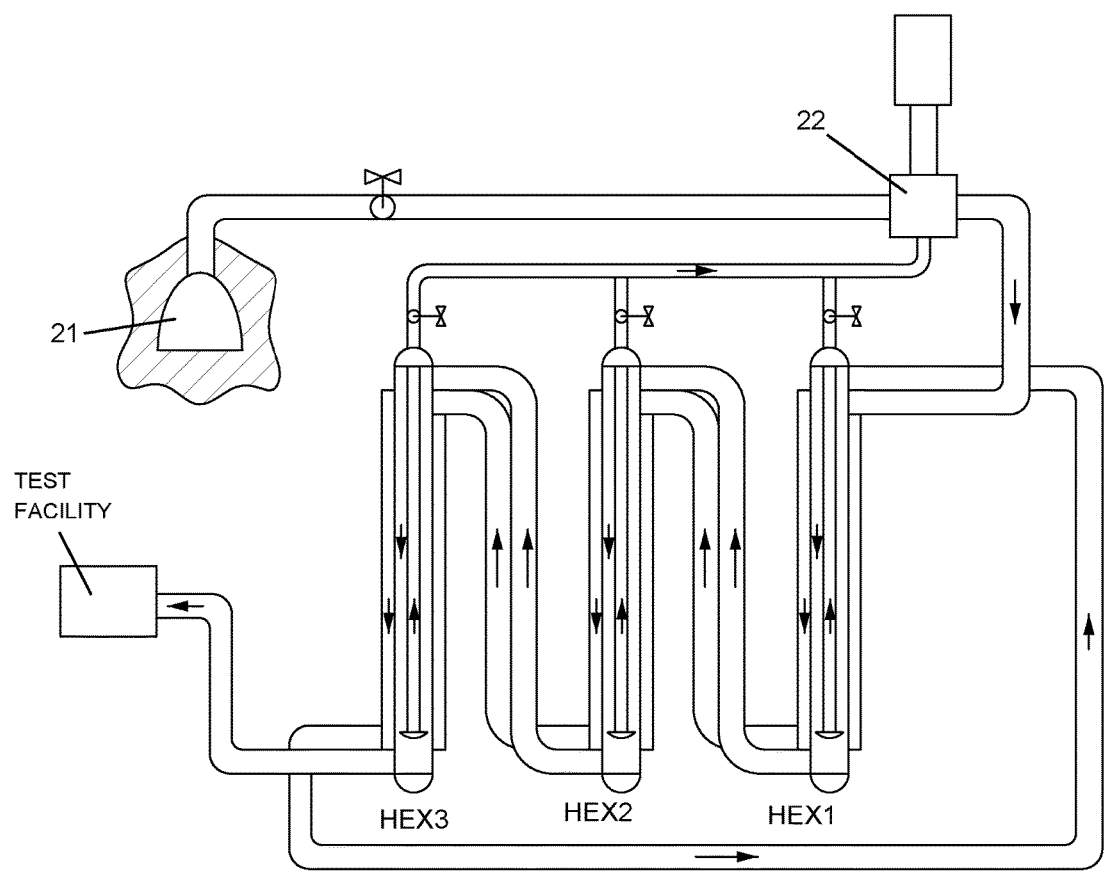
FIG. 7 shows a vertically oriented heater facility for producing the high temperature and high pressure compressed air for testing.

The high temperature and high pressure compressed air facility is shown in one embodiment in FIG. 7 with three vertically oriented counter flow heat exchangers 10. Compressed air from a source such as an underground storage reservoir is preheated in a conventional heat exchanger assembly using a fuel such as natural gas to produce a non-vitiated compressed air that then flows through the recuperator 22 and then into the first heat exchanger 10 (HEX1) and flow upwards. A prior art non-vitiated compressed air heater is limited to around 1,100 degrees F. due to material properties and material costs. Some of the non-vitiated compressed air at 1,100 F is bled off and flow up and then down through the first heat exchanger (HEX1) where fuel is burned with the compressed air to produce heated compressed air at around 2,000 F that is passed through the tubes 15 to transfer heat to the non-vitiated compressed air flowing in an upward direction. The heated compressed air in the tubes flows through heat pipes as discussed above, and thus the heat pipes being oriented in a vertical direction makes use of gravity to facilitate the circulation of the heat exchange fluid within the series of heat pipes in each of the heat exchangers 10. The heated non-vitiated compressed air from the first heat exchanger (HEX1) flows out at 1,330 F and then enters the second heat exchanger (HEX2) where it is further heated by vitiated compressed air at 2,000 F due to the addition of fuel burning with the exhaust burned air from the first heat exchanger (HEX1). The heated non-vitiated compressed air from the second heat exchanger (HEX2) exits at 1,490 F and then flows into the third heat exchanger (HEX3). The third heat exchanger (HEX3) operates as does the other two and heats the non-vitiated compressed air up to the 1,600 F that then enters the test section where the object to be tested is supplied with the high temperature and high pressure non-vitiated compressed air. For this particular embodiment of the compressed air heating facility, the non-vitiated compressed air enters the test area AT 1,600 f at 67 pound per second and 800 psi. The burned compressed air exits the third heat exchanger (HEX3) at around 1,490 F and 13 pound per second at around 600 psi and flows through the recuperator 22 to preheat the compressed air supplied from the underground storage reservoir.

We claim the following:

1. A high temperature and high pressure non-vitiating heater comprising:
    an enclosed cylinder with a non-vitiated compressed air inlet end and a non-vitiated compressed air outlet end;
    a plurality of heat transfer tubes located within the enclosed cylinder;
    each heat transfer tube having an inlet end and an outlet end;
    each heat transfer tube having a heat pipe on an upstream section and an exhaust pipe on a downstream section;
    each heat transfer tube having an ignitor on an upstream end of the tube;
    the enclosed cylinder and the heat transfer tubes being counter flowing; and,
    non-vitiated compressed air at a lower temperature flows within the enclosed cylinder over the heat transfer tubes, some of the non-vitiated compressed air at a lower temperature reverses and flows through the heat transfer tubes and is burned with a fuel to transfer heat to the non-vitiated compressed air flowing within the enclosed cylinder, and the remaining non-vitiated compressed air from the enclosed cylinder flows out the outlet end as non-vitiated compressed air at a higher temperature.

2. The high temperature and high pressure non-vitiating heater of claim 1, and further comprising:
    the enclosed cylinder and the heat transfer tubes are vertically arranged.

3. The high temperature and high pressure non-vitiating heater of claim 2, and further comprising:
    the heat pipe in each heat transfer tube comprises multiple heat pipes in series.

4. The high temperature and high pressure non-vitiating heater of claim 3, and further comprising:
    each of the series of heat pipes is substantially two feet in length.

5. The high temperature and high pressure non-vitiating heater of claim 1, and further comprising:
    the ignitor is an acoustic attenuation ignitor with an inlet opening for the reverse flow non-vitiated compressed air and an inlet for a fuel.

6. The high temperature and high pressure non-vitiating heater of claim 1, and further comprising:
    the heat pipe is an isothermal furnace liner type heat pipe; and,
    the exhaust pipe is made of Haynes 230 material.

7. A compressed air facility to supply a high temperature and high pressure non-vitiated compressed air to a test section for testing an object under high pressure and high temperature conditions comprising:
    a recuperator to preheat a non-vitiated compressed air from a source of compressed air;
    a first heat exchanger with a first non-vitiated compressed air inlet and a first non-vitiated compressed air outlet;
    a second heat exchanger with a second non-vitiated compressed air inlet and a second non-vitiated compressed air outlet;
    a third heat exchanger with a third non-vitiated compressed air inlet and a third non-vitiated compressed air outlet;
    the first heat exchanger having a first heat pipe with a first heat pipe inlet with a first heat pipe burner and a first heat pipe outlet;
    the second heat exchanger having a second heat pipe with a second heat pipe inlet with a second heat pipe burner and a second heat pipe outlet;
    the third heat exchanger having a third heat pipe with a third heat pipe inlet with a third heat pipe burner and a third heat pipe outlet;
    the first heat pipe connected to the non-vitiated compressed air supply between the recuperator and the first heat exchanger;
    the third heat pipe outlet connected to the recuperator; and,
    non-vitiated compressed air from the source of compressed air is preheated in the recuperator using hot exhaust from the third heat pipe, passed through the first heat exchanger to add additional heat, passed through the second heat exchanger to add additional heat, and passed through the third heat exchanger to add additional heat.

8. The compressed air facility of claim 7, and further comprising:
    The first and second and third heat exchangers are vertically oriented such that the heat pipes recirculate a heat exchange fluid under an influence of gravity.

9. The compressed air facility of claim 8, and further comprising:
    Each of the first and the second and the third heat pipes is formed from a series of heat pipes stacked in a vertical direction.

10. The compressed air facility of claim 9, and further comprising:
    Each of the heat pipes in the series is around two feet in length.

11. The compressed air facility of claim 7, and further comprising:
    the first and second and third heat exchangers heats the non-vitiated compressed air from around 1,100 degrees F. to around 1,600 degrees F.

12. The compressed air facility of claim 7, and further comprising:
    Each of the first and second and third heat pipes includes an acoustic attenuation ignitor at an upstream end that burns a fuel with non-vitiated compressed air entering the heat pipe.

13. The compressed air facility of claim 7, and further comprising:

Each of the first and second and third heat pipe burners produce a heated compressed air at around 2,000 degrees F. that then passes through each heat pipe.

14. The compressed air facility of claim 7, and further comprising:

The source of non-vitiated compressed air enters the recuperator at around 1,100 degrees F.

15. A process for heating a non-vitiated compressed air to at least 1,600 degrees F. comprising the steps of:

supplying a non-vitiated compressed air at around 1,100 degrees F. to a recuperator to pre-heat to the non-vitiated compressed air;

passing the pre-heated non-vitiated compressed air through a first heat exchanger having a first heat pipe therein;

burning a fuel in the first heat pipe along with some of the pre-heated non-vitiated compressed air to produce a hot gas that adds heat to the non-vitiated compressed air passing through the first heat exchanger;

passing the heated non-vitiated compressed air from the first heat exchanger through a second heat exchanger having a second heat pipe therein;

burning a fuel in the second heat pipe along with some of the heated non-vitiated compressed air to produce a hot gas that adds heat to the non-vitiated compressed air passing through the second heat exchanger;

passing the heated non-vitiated compressed air from the second heat exchanger through a third heat exchanger having a third heat pipe therein;

burning a fuel in the third heat pipe along with some of the heated non-vitiated compressed air to produce a hot gas that adds heat to the non-vitiated compressed air passing through the third heat exchanger;

discharging the non-vitiated compressed air from the third heat exchanger at a temperature of at least 1,600 degrees F.

16. The process for heating a non-vitiated compressed air to at least 1,600 degrees F. of claim 15, and further comprising the step of:

orienting the heat exchangers and the heat pipes in a vertical direction such that gravity with assist in recirculating a heat exchange fluid contained in each of the heat pipes.

17. The process for heating a non-vitiated compressed air to at least 1,600 degrees F. of claim 16, and further comprising the step of:

forming each of the first and second and third heat pipes from a series of heat pipes of around two feet in length stacked together.

18. The process for heating a non-vitiated compressed air to at least 1,600 degrees F. of claim 15, and further comprising the step of:

the step of burning a fuel in each of the heat pipes includes using an acoustic attenuation ignitor.

* * * * *